Patented Sept. 1, 1925.

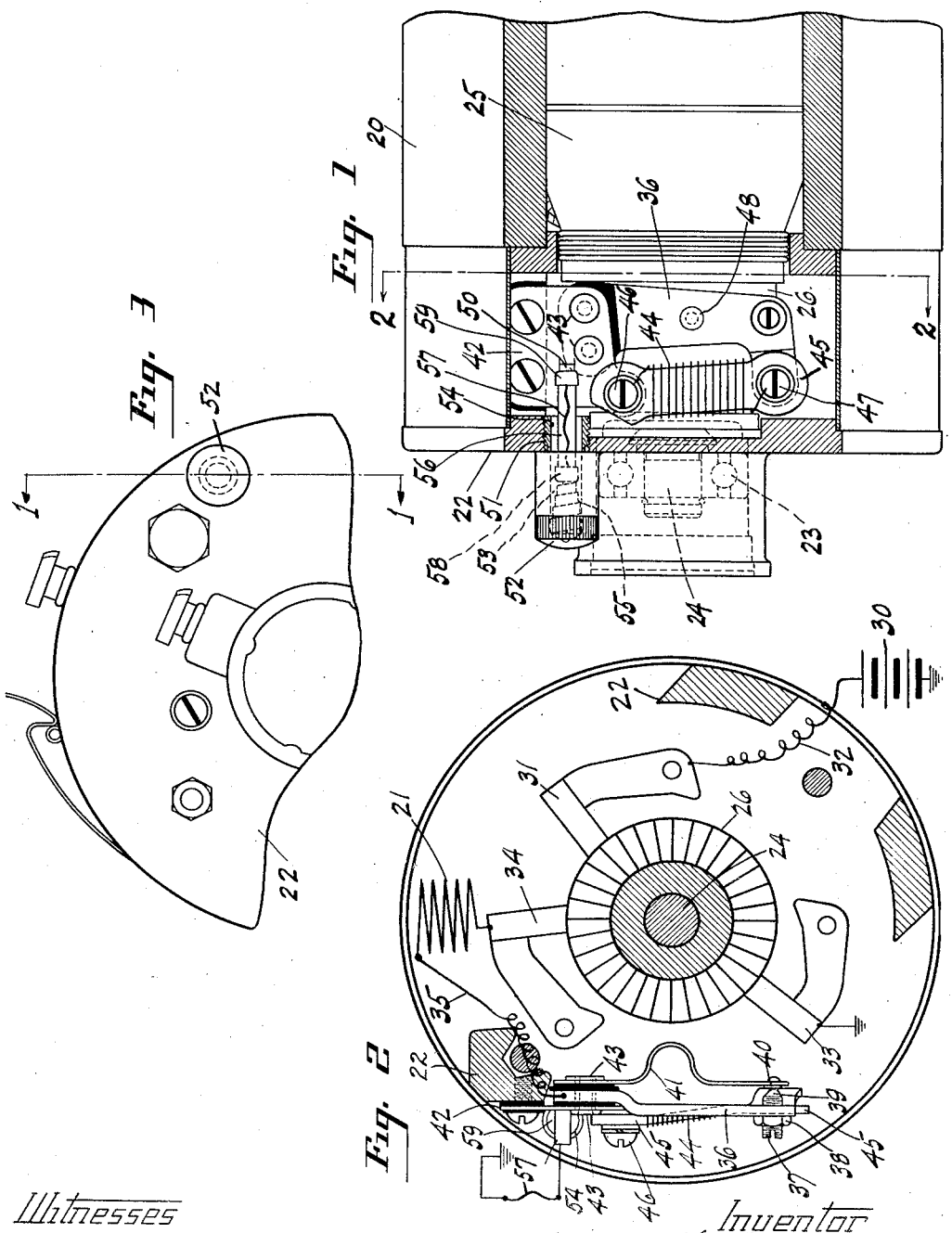

1,552,079

UNITED STATES PATENT OFFICE.

FRANK H. PRESCOTT, OF ANDERSON, INDIANA, ASSIGNOR TO GENERAL MOTORS CORPORATION, A CORPORATION OF DELAWARE.

PROTECTIVE DEVICE.

Application filed February 4, 1922. Serial No. 534,105.

*To all whom it may concern:*

Be it known that I, FRANK H. PRESCOTT, a citizen of the United States of America, residing at Anderson, county of Madison, State of Indiana, have invented certain new and useful Improvements in Protective Devices, of which the following is a full, clear, and exact description.

This invention relates to protective devices for electrical circuits and particularly for dynamo-electric-machines.

It is one of the objects of the invention to provide convenient and accessible means for retaining a fuse in an electrical circuit of a dynamo for example the field circuit.

Further objects and advantages of the present invention will be apparent from the following description, reference being had to the accompanying drawings, wherein a preferred embodiment of the present invention is clearly shown.

In the drawings:

Fig. 1 is a fragmentary side elevation, partly in section, of a dynamo-electric-machine provided with the present invention, the section being taken substantially on the line 1—1 of Fig. 3;

Fig. 2 is a sectional view taken on the line 2—2 of Fig. 1. This sectional view is arranged with a wiring diagram illustrating the circuit of a generating and battery charging system; and Fig. 3 is a fragmentary end elevation.

Referring to the drawings, 20 designates the field frame of a dynamo-electric-machine supporting field windings illustrated diagrammatically at 21 in Fig. 2. The frame 20 is attached to end frames which support the dynamo shaft bearings. One of these end frames is shown at 22 and supports a bearing 23 supporting the dynamo shaft 24, one end of which is seen in Figs. 1 and 2. Shaft 24 supports armature 25 having suitable windings connected with the commutator 26.

The main circuit from the armature to the battery 30 is provided by main brush 31 connected by wire 32 with battery 30 and by main brush 33 which has a ground connection with battery 30. The generator field circuit includes auxiliary or third brush 34 connected with field winding 21 which is connected by wire 35 with the frame member 36 of a temperature responsive device for controlling the battery charge rate.

This device is more particularly described and claimed in my copending application Serial No. 428,362, filed December 4, 1920, the same constituting an improvement on the device disclosed in the patent to O. F. Conklin No. 1,352,051, issued September 7, 1920. Bracket 36 supports an adjusting screw 37 held in position by nut 38, and screw 37 carries a contact 39 normally in engagement with a contact 40 carried on the end of a blade 41 of thermostatic material preferably of a strip of brass and a strip of steel attached together. Frame 36 and blade 41 are supported by a bracket 42 which in turn is supported by end frame 22 but insulated therefrom. The frame 36 is insulated from bracket 42 and from blade 41 while blade 41 is electrically connected with the bracket 42 by means of tubular rivets 43 which secure together the members 36, 41 and 42. A resistance element 44 is wound about a non-conducting strip 45 preferably of mica, and the ends of resistance 44 are connected with screws 46 and 47 having threaded engagement with bracket 42 and frame 36, respectively. Frame 36 may be provided with a terminal screw 48 for attaching the wire 35.

Bracket 42 is provided with an extension 50 part of which is in alignment with and adjacent to a threaded opening 51 provided in the wall of dynamo end frame 22. A spring retaining member 52 having a centrally bored out recess 53 is provided with an externally threaded reduced portion 54 engaging with the tapped hole 51. The recess 53 provides a seat for a spring 55 preferably formed of a strip of material wound in a spiral. Between spring 55 and the extension 50 of the bracket 42 is located a fuse member 56 of a type generally applied to the circuits of automobile electrical systems. This fuse 56 generally includes a glass tube enclosing a fuse wire 57 connected with fuse terminals 58 and 59 which close the ends of the glass tube. In Fig. 1 it is apparent that the terminal 58 bears against the spring 55 while the terminal 59 bears against extension 50 of bracket 42.

Normally the field circuit includes the following elements: brush 34, field winding 21, wire 35, frame 36, screw 37, contact 39, contact 40, blade 41, rivets 43, bracket 42, extension 50, fuse terminal 59, fuse wire 57, fuse terminal 58, spring 55, spring retainer 52, dynamo end frame 22, and thence to ground. The ground connection is generally provided through the engine and frame of the automobile to which one terminal of the battery is attached. As the temperature of the atmosphere surrounding the dynamo increases, the blade 41 will bend toward the commutator 26 causing contacts 39 and 40 to be separated at some predetermined temperature. When this occurs the field circuit will include the following elements: brush 34, field windings 21, wire 35, frame 36, screw 47, resistance 44, screw 46, bracket 42, extension 50, fuse terminal 59, fuse wire 57, fuse terminal 58, spring 55, spring retainer 52, dynamo end frame 22. The inserting of the resistance 44 in the field circuit decreases the field current and consequently the battery charging characteristics of the machine will be modified in accordance with external temperature conditions.

The fuse 57 protects the field circuit from overheating through excessive amperage which would occur for example if the battery 30 should become disconnected from the generator. Replacing the fuse member 56 is a very simple matter. The spring retainer 52 is simply unscrewed from the dynamo frame 22, the fuse member 56 is withdrawn and a new one substituted and the spring retainer 52 is screwed back into position.

It is apparent that the mounting of the fuse has been accomplished in a very simple manner. One terminal of the fuse bears against a portion of bracket 42 which is a part of the regular equipment of the machine where a temperature responsive regulator is required. Since the dynamo frame generally provides a ground connection for one of the main brushes this frame can be utilized to provide a ground connection for the fuse. Therefore it is apparent that but two additional parts are required to mount the fuse in position, namely the spring 55 and the spring retainer 52 which serves also as a housing for a portion of the fuse member 56.

While the form of mechanism herein shown and described constitutes a preferred form of embodiment of the invention, it is to be understood that other forms might be adopted, all coming within the scope of the claims which follow.

What I claim is as follows:

1. In combination with a generator having a frame and field windings, a circuit for grounding said field windings upon said frame including a conducting member insulated from said frame, a fuse having end terminals, a conducting member enclosing a portion of said fuse and providing an electrical connection between the fuse and said generator frame, and a conducting spring located between one of said members and one of the fuse terminals whereby said fuse is yieldingly held in engagement with the other of said members.

2. In combination with a generator having a frame and field windings, a circuit for grounding said field windings upon said frame including a conducting member insulated from said frame, a fuse member having end terminals, a conducting spring maintaining one end of said fuse member in contact with said conducting member, and a spring holding member removably mounted upon said frame and grounding said spring upon said frame.

3. In combination with a generator having a frame and field windings, a circuit for grounding said field windings upon said frame including a conducting member insulated from said frame, and located within said frame, said frame having a tapped hole adjacent said member, a fuse member having end terminals and extending through said hole, a conducting fuse holder having threaded engagement with said tapped hole and provided with an axial recess, a conducting spring within said recess, and a fuse member having end terminals one engaged by said spring and the other engaging said conducting member.

4. In combination with a generator having a frame and field windings, a circuit for grounding said field windings upon said frame including a conducting member insulated from said frame and located within said frame, said frame having a hole adjacent said member, a fuse having end terminals and extending through said hole, a member for covering said hole and provided with a recess for enclosing said fuse, and a conducting spring located between one of the fuse terminals and one of said members whereby the other fuse terminal is yieldingly pressed against the other of said members.

In testimony whereof I hereto affix my signature.

FRANK H. PRESCOTT.